(12) United States Patent
Asher et al.

(10) Patent No.: US 6,674,518 B1
(45) Date of Patent: Jan. 6, 2004

(54) METHOD AND APPARATUS FOR OPTICAL TIME DOMAIN REFLECTOMETRY (OTDR) ANALYSIS

(75) Inventors: Michael L. Asher, Green Grove Springs, FL (US); Hossein Eslambolchi, Los Altos Hills, CA (US); Charles C. Giddens, Conyers, GA (US); Christopher Rollin Giles, Auburn, AL (US); John Sinclair Huffman, Conyers, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/187,485

(22) Filed: Jul. 1, 2002

(51) Int. Cl.[7] ............................................... G01N 21/00
(52) U.S. Cl. ...................................... 356/73.1; 702/190
(58) Field of Search .................... 356/73.1; 250/227.15, 250/227.16, 227.18; 702/190–195, 70

(56) References Cited

U.S. PATENT DOCUMENTS

| | | | | |
|---|---|---|---|---|
| 4,898,463 A | * | 2/1990 | Sakamoto et al. | 356/73.1 |
| 5,365,328 A | * | 11/1994 | Anderson | 356/73.1 |
| 5,652,715 A | * | 7/1997 | Hanson | 356/73.1 |

\* cited by examiner

*Primary Examiner*—Richard A. Rosenberger
*Assistant Examiner*—Vincent P. Barth (57) ABSTRACT

The present invention is directed to a method and apparatus for testing a fiber-optic cable. An Optical Time Domain Reflectometer (OTDR) is presented. Test signals are generated from the OTDR and received by the OTDR for processing. The received test signals are sampled and analyzed. The received test signals include reflectance spikes and a slope. A first-order derivative is taken of the received signal. The first-order derivative is then filtered to remove the reflectance spikes and the slope. Discontinuities in the filtered first-order derivative denote a fault in the fiber-optic cable.

8 Claims, 5 Drawing Sheets

METHOD AND APPARATUS FOR OPTICAL TIME DOMAIN REFLECTOMETRY (OTDR) ANALYSIS

BACKGROUND OF THE INVENTION

1. Field of the Invention

This invention relates to testing. Specifically, the present invention relates to testing fiber-optic cables.

2. Description of the Related Art

With the expansion of the Internet, wireless communications and conventional telephony, the need for communication services has increased. The increased need for communication services correlates to an increased need for communication infrastructure. Modern high bandwidth communication infrastructure is typically implemented with fiber-optic cable.

Fiber-optic cable provides high bandwidth communications. The cable itself typically consists of a glass-like core surrounded by several layers of protective material. Communication is accomplished in fiber-optic cable by transmitting light down the glass-like core. Information is modulated on the light and conveyed between transmission points. The light travels on material (e.g. core material) that serves as a transport medium. The transport medium has characteristic properties that can be measured and characterized. The glass-like core has to be properly matched with other pieces of fiber-optic cable and communications equipment. If the core is not properly matched light reflections occur disrupting the communications.

Fiber-optic cable deployed for commercial use may be damaged or have faults. For example, the glass-like core may crack or fracture under stress or when new pieces of fiber-optic cable are connected together, the light traveling down the glass-like core medium may be inappropriately reflected. Therefore in addition to the increase and focus on deploying fiber-optic cable, there is an increased interest in troubleshooting fiber-optic cable.

One noted approach for troubleshooting fiber cable uses an Optical Time Domain Reflectometer (OTDR). OTDR is used to evaluate the characteristic properties of fiber. An OTDR generates an initial light signal (e.g. reference trace) to characterize the fiber-optic cable. If the light hits any discontinuities (e.g. faults) such as cracks, fractures, bends, breaks in the cable, connection points to other cables, or connections to end electronics; the initial light signal reflects back (e.g. reflected signal) to the OTDR. The OTDR calculates the distance to the discontinuity in the fiber by measuring the time elapsed between transmission of the initial light signal and reception of the reflection.

In addition to reflected signals that result from faults, as light travels along fiber, it is attenuated by Raleigh scattering. This is caused by small changes in the index of refraction of the glass-like core. Some of the light scatters directly back to the OTDR. This effect is called back scattering. The back scattered light (e.g. reflected signal) is used as a means of characterizing the fiber-optic cable when there are no faults or when there are known faults such as connection points between fibers.

Generally speaking, a fault is anything that causes a loss in the reflection of the normal scattering of the fiber material. An OTDR displays the result of reference signals and test signals on a display. The vertical access of the display represents power in decibels and the horizontal access of the display represents distance.

During operation of an OTDR, the OTDR is connected to the fiber cable. The OTDR generates a reference trace to characterize the fiber. In addition the OTDR generates a test trace to test the fiber. The reference trace is compared with the test trace. An operator inputs and maintains threshold information and known fault information. For example, the threshold information defines the amount of difference that the operator is willing to accept, between a reference trace and a test trace, before he considers a discontinuity a fault. Known faults are points along a cable run where the operator expects to see a discontinuity such as a location where the fiber-optic cable is connected to other fiber-optic cables or equipment. Discontinuities from known faults produce a positive spike when the trace is graphed on the OTDR display. These spikes are often referred to as reflectance spikes.

Test traces may then be measured. The test traces works in the same way as a reference trace. An initial light signal is sent down the fiber-optic cable and a reflected signal comes back to the cable. The test trace is then compared to the reference trace. If the two traces are outside of a threshold limit, an operator is able to detect a possible fault. The operator will then go out to make a physical inspection to determine if the fault is an actual fault or a false alarm. For example, an operator may establish that a distance between the reference trace and the test trace of 3 db (e.g. known as a user-input threshold) is acceptable, however, a difference between the test trace and the reference trace of 4 db may be unacceptable (e.g. signal a fault).

In conventional OTDR systems both the reference trace and the test trace are displayed on a screen for the operator to review the two patterns. Using visual analysis, the operator attempts to detect and determine whether there is a discontinuity (e.g. fault) within the fiber-optic cable. Once a discontinuity is determined and identified, most OTDR systems also calculate the distance to the discontinuity by measuring the return time for the reflected signal.

In conventional OTDR systems fault analysis is traditionally done by sampling the loss of signal at various points along the length of fiber-optic cable. The loss levels are then compared to the corresponding points on a known good trace. When the difference between the two traces exceeds a certain threshold, a fault is expected to have occurred. However the threshold may be exceeded by many other factors, such as the insertion of equipment, degraded output of the OTDR light source, etc. As a result, in conventional OTDR systems there are a large number of false alarms. In addition, actual failures may be detected properly, but imprecisely located if the fault location does not correspond with the user-input threshold. Therefore the detection of faults requires manual oversight as well as the input and maintenance of threshold loss values which trigger an alarm. These values are arbitrarily chosen on a per cable basis and the values have to be updated whenever the cable and other parameters change.

Figure 1:
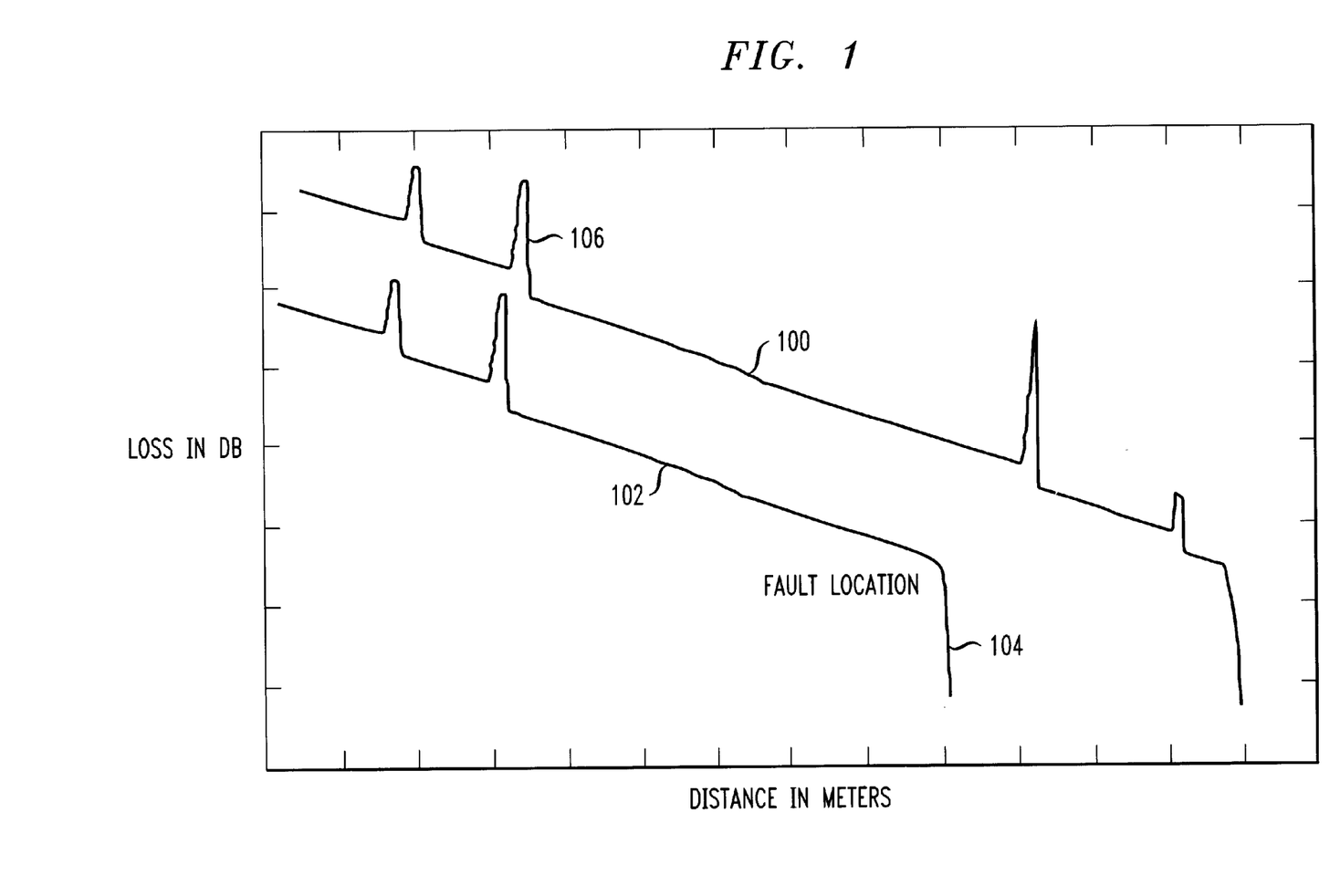
FIG. 1 displays a screen display in a conventional OTDR system.

An OTDR display is shown in FIG. 1. The OTDR display is a graph with the loss in decibels shown along the vertical axis and the distance in meters shown along the horizontal axis. A reference trace is shown as 100. The reference trace identifies the characteristic pattern (e.g. waveform) of the fiber-optic cable. A test trace may then be generated and compared to the reference trace to determine faults in the fiber. A test trace is shown as 102. The test trace is compared to the reference trace 100 to determine any faults in the fiber. As shown in FIG. 1, the reference trace and the test trace mirror each other until the fault location shown as 104. The fault location 104 would designate a fault. It should also be noted that a spike such as the spike shown as 106 is referred to in the art as a reflectance spike.

Figure 2:
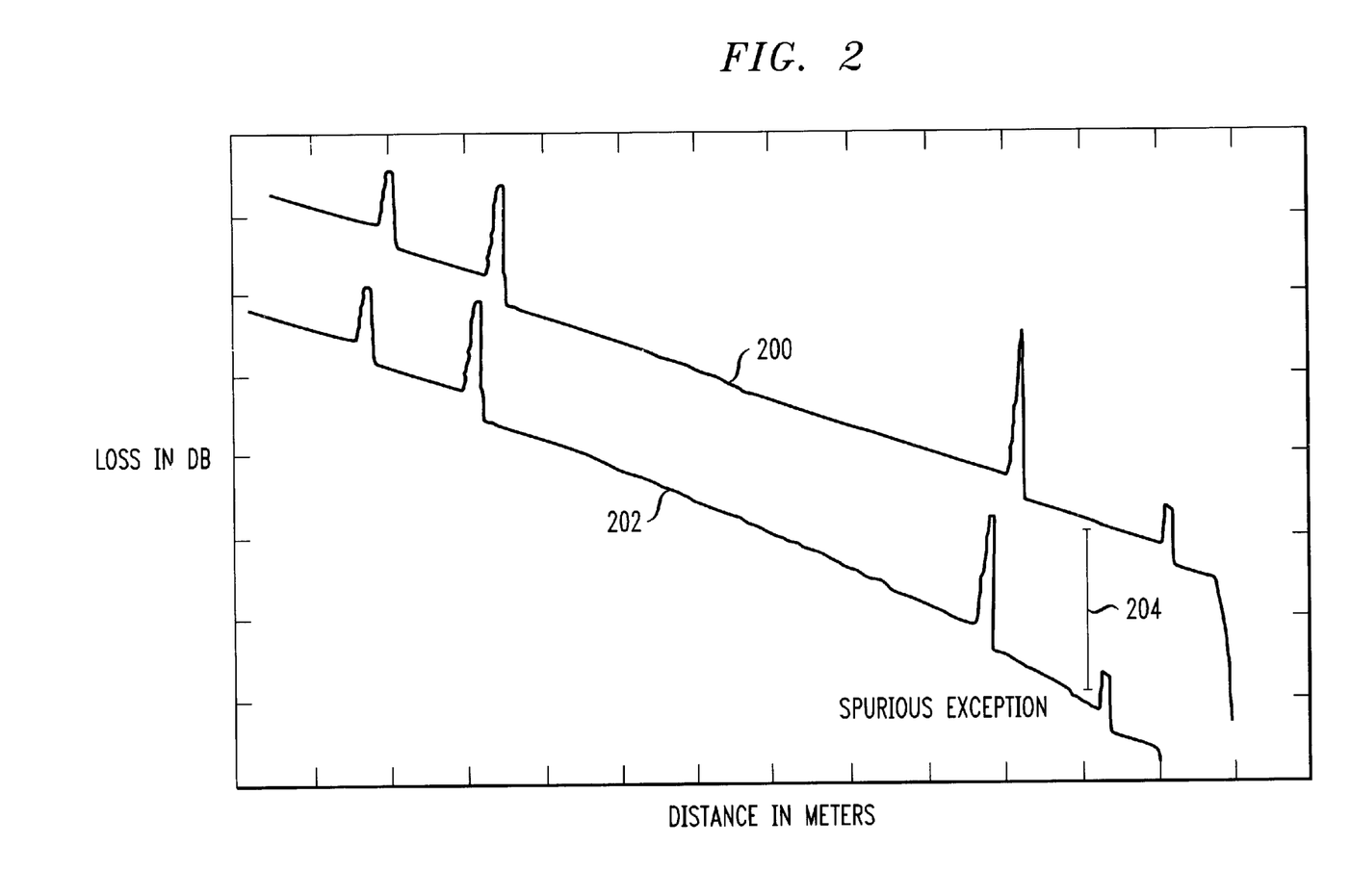
FIG. 2 displays a false alarm, in a conventional OTDR system.

FIG. 2 displays a false alarm in a conventional OTDR system. A threshold is established for the difference between a reference trace and a test trace. If the threshold is exceeded, it is an indication to the operator that a fault exists in the fiber-optic cable. In FIG. 2, a reference trace is shown as 200. The reference trace 200 characterizes the fiber-optic cable. A test trace is shown at 202, the test trace mirrors the reference trace. A threshold is shown as 204. The threshold is a user-defined limit, above which an alarm is signaled which represents a fault in the fiber-optic cable. As shown in FIG. 2, the reference trace 200 and the test trace 202 are separated by more than the threshold shown as 204. However, this may be a false alarm. The difference in value may be caused by the insertion of equipment, degraded output of the OTDR light source, etc. However, there is no way for the operator to tell whether this is a false alarm or not, without making physical and manual inspections of the fiber-optic cable, at the point of the potential fault.

In addition, when new cable is attached to the fiber-optic cable or new equipment is connected to the fiber-optic cable a new reference trace must be produced and new-user defined limit may need to be established. Therefore there is a continual need to change and store new reference traces and update user-defined limits, as a result of the continuing development, redesign or reengineering of a network which includes the fiber-optic cable.

Thus there is a need for an OTDR system that reduces the amount of false alarms. There is a need for an OTDR system that provides improved fault location without manual intervention. There is a need for an OTDR system that automatically detects faults without a reference trace. Lastly, there is a need for an OTDR system that has less reliance on manual input, the maintenance of thresholds and the maintenance of performance parameters.

SUMMARY OF THE INVENTION

A method and apparatus for testing fiber-optic cable is presented. Signal information is collected using an Optical Time Domain Reflectometer (OTDR). The signal information includes information on the performance and characteristics of the fiber-optic cable. Characteristics such as scatter profile information, fault information, etc, is acquired. After the acquisition of the signal information, post acquisition processing is performed on the signal information. The post acquisition processing includes taking a derivative of the signal information, such as a first-order derivative of the signal information. The waveform detailing the results of the post acquisition processing is displayed for operator review. By reviewing the first-order derivative an operator is able to accurately locate and determine a fiber-optic fault.

In one embodiment of the present invention, a method of testing fiber-optic cable represented by a trace is presented. The trace includes reflectance spikes and a slope. The method comprises the steps of sampling the trace thereby producing sampled values; generating a first-order derivative of the sampled values thereby producing differential values including the reflectance spikes and the slope; removing the reflectance spikes from the differential values thereby producing sloped values including the slope; removing the slope from the sloped values thereby producing filtered values; and identifying a discontinuity in the filtered values thereby determining a fault. Further, in the method testing fiber-optic cables the step of removing the reflectance spikes includes the step of determining that the differential values have a positive slope. Lastly, in the method testing fiber-optic cables the step of removing the reflectance spikes includes the step of determining that the differential values exceed a trigger.

In another embodiment, a method of testing fiber-optic cable represented by a trace is presented. The method comprises the steps of generating a first-order derivative of the trace and determining a fault in response to the first-order derivative.

In an alternate embodiment, a method of testing comprises the steps of acquiring signal information from a fiber-optic cable, the signal information characterizing operation of the fiber-optic cable; determining a rate of change of the signal information; and determining a fault in the fiber-optic cable in response to the rate of change of the signal information.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus for fault detection in a fiber-optic cable is presented. In one method of the present invention an OTDR is used for fault detection. A computer and a database are associated with the OTDR. The database includes reference trace information, on fiber-optic cables that are monitored by a specific OTDR. The reference traces are stored for future use. Tests are made using information in the database and the test information (e.g. test trace) is stored in the database in response to the test made by the OTDR. The computer processes the data in the database to perform analysis and displays the processed information on a screen for operator review. The operator reviews the displayed information and makes determinations about the state of the fiber-optic cable.

In one embodiment of the present invention an OTDR trace is taken of a fiber optic cable. The OTDR trace is digitized into samples and a first-order derivative is taken of each sample. Any spurious values that are due to known faults (e.g. reflectance spike) are filtered out and then each value is analyzed to determine if a threshold value is exceeded. For example, assuming that the digitized values associate with a test trace are 2, 3, 5, 10 and 11. Each value is a digital sample of the trace and corresponds to a specific location in the fiber-optic cable. The rate of change (e.g. the first-order derivative) between 2 and 3, 3 and 5, and 10 and 11, is one. However, the rate of change between 5 and 10 is five. As a result, in the method and apparatus of the present invention, since the differential value of the rate of change between 5 and 10 has substantially increased and the value of 5 and 10 correspond to locations within the fiber-optic cable, it may be determined that a fault occurred within the fiber-optic cable between the physical location that correspond to the digital samples 5 and 10. The differential value of five is an instantaneous rate of change and will typical approach infinity in a practical application.

In the present invention, analysis is made of a first-order derivative of the loss with respect to position (e.g. dl/dx), of a test trace. It should be appreciated that multiple order derivatives may also be used such as third order, fourth order, etc. and still remain within the scope of the present invention. A test trace is sampled. A first-order derivative of the test trace is taken using piece-wise approximation, Runge-Kutta, or other numerical techniques and reference trace readings are taken and filtered to remove reflectance spikes. For homogeneous cable lengths, the resulting graph represents the attenuation coefficient of the fiber-optic cable and should approximate a constant. Any discontinuity in the first-order derivative indicates either a fault, or a location of a connection point or equipment transition. However, the location of a connection point or equipment transition can be filtered out by a pre-set exception threshold, which allows for fault detection with or without a reference trace. The threshold value is a static value, as a result, it does not vary with the cable length or the number of equipment transitions on the cable. Therefore, maintaining changing equipment values or changes in cable lengths is eliminated.

Figure 3:
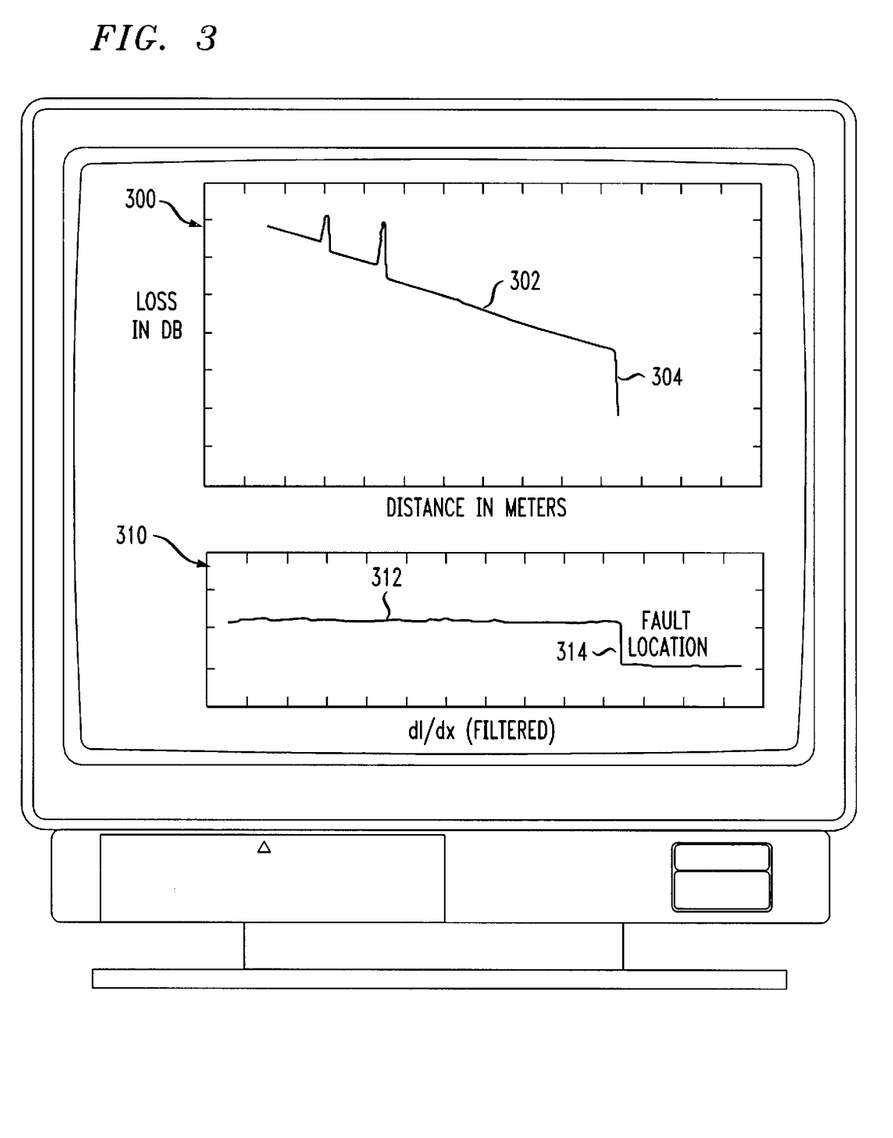
FIG. 3 displays a screen display of an OTDR system implementing the method and apparatus of the present invention.

FIG. 3 displays an OTDR display (e.g. screen) implementing the method and apparatus of the present invention. A graph of a reference trace or a test trace may be displayed on an OTDR screen or may be displayed on a computing device associated with the OTDR screen. In FIG. 3 two graphs are shown. A first-order derivative 300 (e.g. test trace) is shown and a filtered first-order derivative 310 is shown. The filtered graph of the first-order derivative 310 is a graph of the first-order derivative with the reflectance spikes and the slope removed. A first-order derivative of a test trace shown as 302 includes a fault 304. The filtered first-order derivative graph 310 includes a filtered trace 312, which indicates a discontinuity (e.g. fault) 314. The filtered trace 312 is a filtered first-order derivative of the loss with respect to position (e.g. dl/dx). Characteristic information on the fiber-optic cable is acquired. The characteristic information provides a loss value for the fiber. If the loss value is plotted as a continuous wave, the loss value is depicted as a smooth curve. A fault in the fiber-optic cable will cause a discontinuity. Therefore, any discontinuity in the filtered trace 312 indicates either a fault, the location of a connection point or an equipment transition. For the purposes of discussion, it will be assumed that the discontinuity 314 represents a fault.

In the method and apparatus of the present invention a preset exception threshold may be set that will remove the discontinuity from being displayed when the discontinuity represents a connection point or equipment transition. During operation an OTDR assesses level changes (e.g. discontinuities) in a fiber trace. In order to avoid reporting minor faults, a limit is set on the amount of change that must occur, before the OTDR reports the change as a fault. In one embodiment of the present invention, the level change is 3 db. The threshold is set in the operating software and may be input by a user or retrieved from a database.

Figure 4:
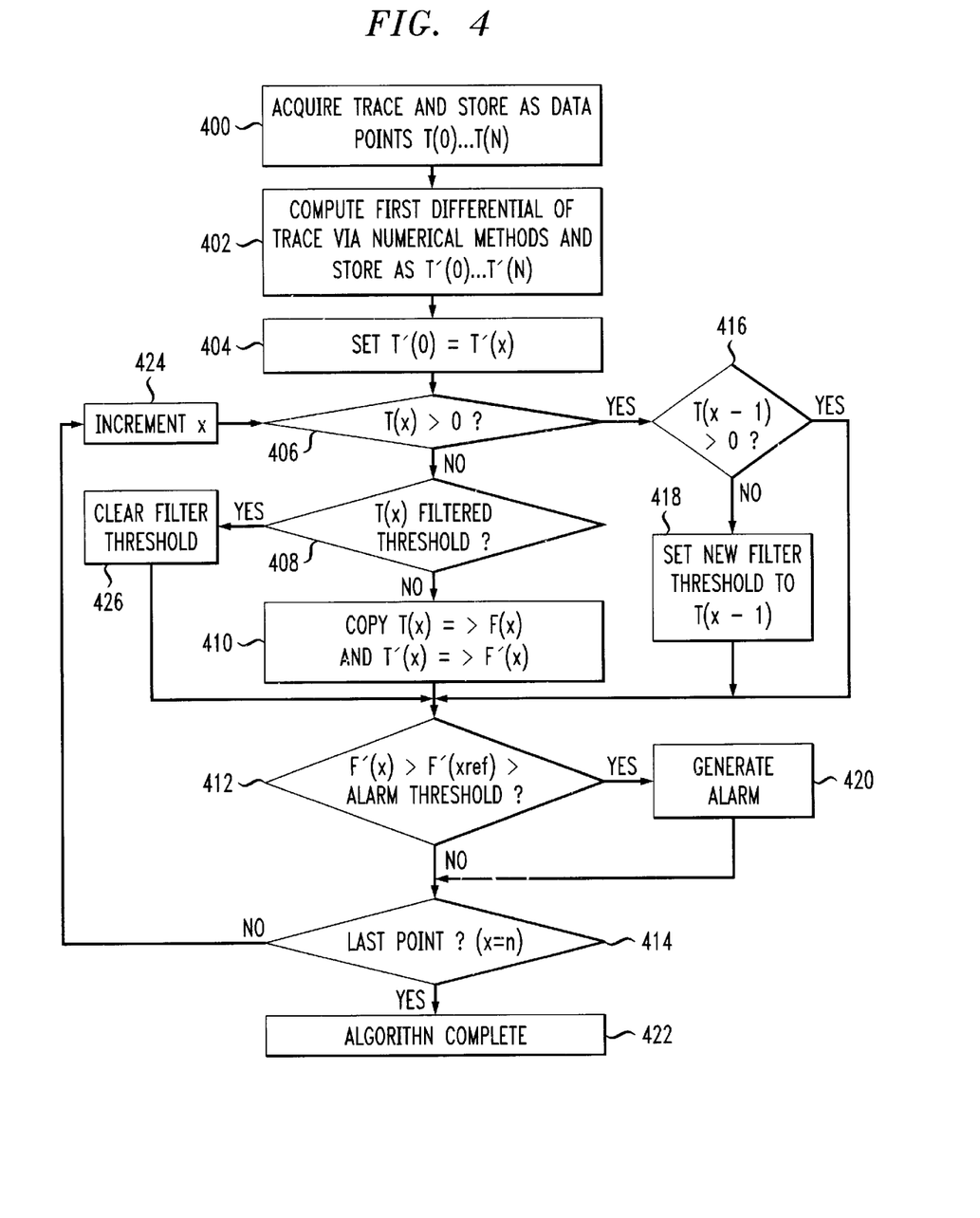
FIG. 4 displays a flow chart implementing a reference trace mode method of the present invention.
Figure 5:
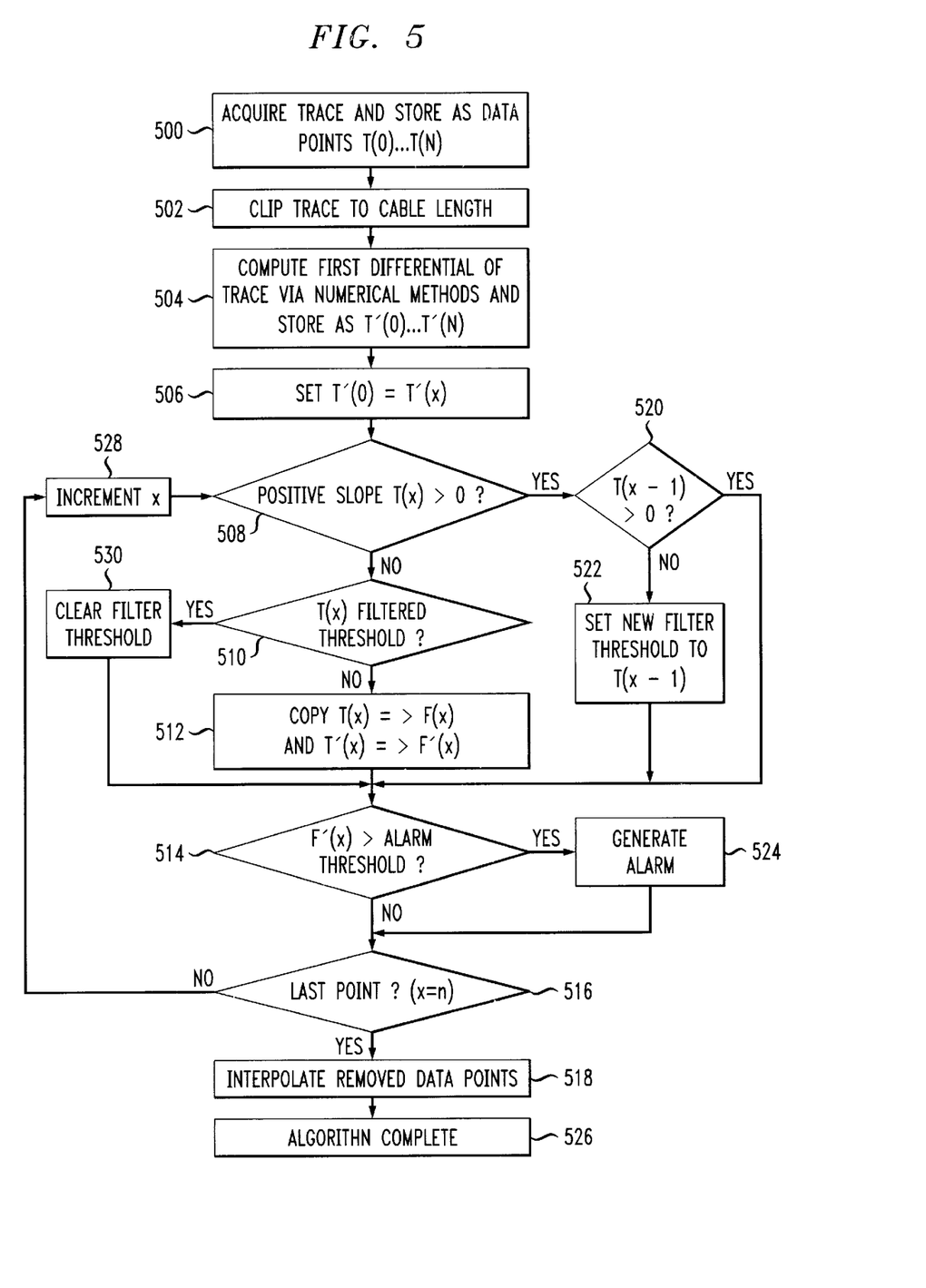
FIG. 5 displays a flow chart implementing a single trace mode method of the present invention.

Two methods of testing a fiber-optic cable are presented with respect to FIGS. 4 and 5. One embodiment utilizes a reference trace. A second embodiment does not use a reference trace. Both embodiments assess the first-order derivative of a test trace. The first-order derivative of a test trace defines the rate of change of a test trace over time. In both methods a test trace is taken. The first-order derivative of the test trace is calculated. The first-order derivative may be performed on samples of the test trace or on a function defining the test trace waveform. An approach is implemented to compensate for reflectance spikes in the test trace. The approach may include analyzing the first-order derivative of the test trace for a positive slope or establishing filter thresholds. For example, in one approach a trigger which represents the actual loss in the fiber-optic cable at that location and then all of samples above the trigger point are discarded unit the sample values return back to the trigger point. In a second approach, analysis is made of the differential change in the samples of the first-order derivative. As the first-order derivative is computed a trigger is set so that as the first-order derivative begins to produce positive samples, the positive values of the first-order derivative are disregarded. It should be appreciated that a first-order derivative will only go positive when a reluctance spike is present otherwise the graph is a decreasing slope. As such, using one of the two aforementioned techniques, a filtered trace is produced by removing any reflectance spikes and the slope of the first-order derivative. The filtered first-order derivative is then analyzed for discontinuities.

Reflectance spikes may occur at locations where the fiber-optic cable has been spliced and connected to other fiber-optic cable or equipment and as a result, a trace signal is reflected. The reflected signals are known as reflectance spikes. The reflectance spikes result from the fact that the fibers don't match completely at splice points. A reflectance spike may not be a fault, however, the reflectance spike will be displayed as a positive spike in a trace.

In one embodiment of the present invention, the reflectance spike is accounted for and removed from the trace pattern. The amount of signal (e.g. reflectance spike) that will be deleted will dependent upon the location of the spike in the trace. For example, as the slope of the first-order derivative goes positive this is an indication of a reflectance spike. Each value on the positive side of the reflectance spike is removed. When the values are no longer positive and hit zero, it is an indication that we are at the top (e.g. peak) of the reflectance spike. An equal amount of values must also be removed on the negative side of the reflectance spike. In addition, an additional amount of values must be removed to get back down to the values associated with the natural loss of the fiber (e.g. the natural slope in the graph). Therefore, prior to and during operation of the OTDR the reflectance spikes are detected and removed.

The number of values that are filtered from the reflectance spike are associated with the location that the reflectance spike occurs in the fiber. The reflectance spike may be detected and eliminated because the reflectance spike has a characteristic signature when it appears on the OTDR display. For example, a reflectance spike is characterized by a sloped trace going from a positive to a negative and a slow roll off as opposed to an abrupt drop in level associated with a fault. In addition, if numerical methods are used, the values of the trace samples may be analyzed using a computer processor operating under computer instructions, which implement numerical methods (e.g. first-order derivative, reflectance spike removal).

In the method of the present invention, a trace (e.g. waveform) is acquired with an OTDR. The trace is stored as digital values. A first-order derivative of the trace (e.g.

digital values) is taken. The trace is then clipped to accommodate the length of the cable. A series of steps are performed to detect and filter any reflectance spikes. A test is made to determine if the slope of the trace is positive. A positive slope represents that a reluctance spike is beginning to appear in the waveform. The waveform should appear with a negative continuous slope because a negative continuous slope represents the natural loss of the fiber. All positive slopes or reluctance spikes are filtered. A filter threshold is continually set to a new level to filter out the positive slope. While the slope is positive, the data points associated with the trace are filtered by an amount equivalent to the positive slope. As a result, as the reluctance spike increases the filtered value increases to remove the reluctance spike. The filtered value is attained from heuristic techniques. The filtered value is based on the total loss of any given fiber-optic cable segment and is computed based on the optical characteristics of the fiber material (e.g. the loss factor due to the optical material of the fiber itself). The optical characteristics of the fiber material (e.g. the, glass-like material), determines the slope that appears when the trace is plotted on a graph. The filtered values represent the loss in the fiber during normal operating conditions. As noted earlier, graphically, the natural loss in the fiber is represented by a smooth downward sloping curve. Once the first-order derivative is filtered and the slope is removed, the filtered first-order derivative of the loss in the fiber would appear graphically a straight line (e.g. 312).

FIG. 4 displays a flow chart implementing a reference trace mode method of the present invention. The reference trace mode method of the present invention is a method of the present invention in which a reference trace is utilized. In FIG. 4 an OTDR or some other method is used to acquire a trace and store the trace as sampled data points as shown at 400. The sampled data points are denoted as T(0) . . . T(N). A first-order derivative of the trace is computed using numerical methods and stored as T'(0) . . . T'(N). A reflectance spike filter is then implemented to remove the reflectance spikes from the first-order derivative. Each static sample value T'(0) is set equal to T'(x) as shown by 404. A test is made to determine if the first-order derivative is positively sloped (e.g. there is a reflectance spike). If the first-order derivative is not sloped or negatively sloped, a test is made to see if the data point exceeds the filter threshold as shown at 408. If the value T(x) is greater than the filter threshold then the filter threshold is cleared as shown at 426. After the filter threshold is cleared as shown at 426, a test is made to determine if the filtered threshold F'(x) is greater than a filter threshold for a reference trace F'(xref), which is greater than an alarm threshold. This is shown at 412 by the relationship F'(x)>F'(xref)>alarm. If the value T(x) is not greater than the filter threshold (e.g. at 408), a copy of T(x) is stored as F(x) and a copy of T'(x) is stored as F'(x), as shown at 410. Afterward a test is made to determine if F'(x)>F'(xref)>alarm threshold as shown at 412.

If the first-order derivative is positively sloped (e.g. there is a reflectance spike) as shown at 406, a test is made to determine whether the next data point is positively sloped as shown at 416. If the next data point is not positively sloped a new filter threshold is set for T(x−1) as shown at 418. A test is then made to determine if F'(x)>F'(xref)>alarm threshold as shown at 412. In the alternative, if the next data point is positively sloped as shown at 416, then a test is made to determine if F'(x)>F'(xref)>alarm threshold as shown at 412. If the test made at 412 is positive an alarm is generated as shown by 420. If the test made at 412 is negative the system determines if this is the last data point in the analysis as shown by 414. If there are more data points to be processed the system loops back to increment the value of x as shown at 424. If on the other hand, this is the last data point, the system ends as shown at 422.

FIG. 5 displays a flow chart implementing a single trace mode method of the present invention. In a single trace mode method there is not need for a reference trace. Data samples are compared to each other and a significant change between data points, signals a reflectance spike. In FIG. 5 an OTDR or some other method is used to acquire a trace and store the trace as sampled data points as shown at 500. The sample data points are denoted by T(0) . . . T(N). The trace is adjusted to the cable length as shown at 502. A first-order derivative of the trace is computed using numerical methods and stored as T'(Q) . . . T'(N) as shown by 504. A reflectance spike-filter is implemented after which the first-order derivative of the trace T'(0) is set equal to T'(x) as shown by 506. A test is made to determine if the first-order derivative is positively sloped as shown by 508. If the first derivative is not sloped or negatively sloped a test is made to see if the data points exceed the filter threshold as shown at 510. If the value T(x) is greater than the filter threshold then the filter threshold is cleared as shown at 530. After the filter threshold is cleared as shown at 530, a test is made to determine if F'(x)>alarm threshold as shown at 514. If the value T(x) is less than or equal to the filter threshold, then a copy of T(x) is stored as F(x) and a copy of T'(x) is stored as F'(x) as shown by 512; after which a test is made to determine if F'(x)>alarm threshold as shown at 514.

If the first differential is positively sloped as shown at 508, a test is made to determine whether the next data point is positively sloped as shown at 520. If the next data point is not positively sloped or equally sloped, a new filter threshold is set for T(x−1) as shown at 522. In the alternative if the next data point is positively sloped as shown at 520, then a test is made to determine if F'(x)>alarm threshold as shown at 514. A test is made to determine if this is the last data point as shown at 514. If the test made at 514 is positive an alarm is generated as shown by 524 and a test is made to determine if this is the last data point as shown at 524. If the test made at 514 is negative a test is made to determine if this is the last data point as shown at 516. If this is not the last data point, the value of x is incremented as show at 528. If this is the last data point, the removed data points are interpolated as shown at 518 and the method is completed as shown at 526.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of testing fiber-optic cable represented by a trace, the trace including reflectance spikes and a slope, the method comprising the steps of:

sampling the trace thereby producing sampled values;

generating a first-order derivative of the sampled values thereby producing differential values including the reflectance spikes and the slope;

removing the reflectance spikes from the differential values thereby producing sloped values including the slope;

removing the slope from the sloped values thereby producing filtered values; and identifying a discontinuity in the filtered values thereby determining a fault.

2. A method testing fiber-optic cable as set forth in claim 1, wherein the step of removing the reflectance spikes includes the step of determining that the differential values have a positive slope.

3. A method testing fiber-optic cable as set forth in claim 1, wherein the step of removing the reflectance spikes includes the step of determining that the differential values exceed a trigger.

4. An apparatus for testing fiber-optic cable represented by a trace, the trace including reflectance spikes and a slope, the apparatus comprising:

means for sampling the trace thereby producing sampled values;

means for generating a first-order derivative of the sampled values thereby producing differential values including the reflectance spikes and the slope;

means for removing the reflectance spikes from the differential values thereby producing sloped values including the slope;

means for removing the slope from the sloped values thereby producing filtered values; and means for identifying a discontinuity in the filtered values thereby determining a fault.

5. A method of testing fiber-optic cable represented by a trace including reflectance spikes, the method comprising the steps of:

generating a first-order derivative of the trace including the reflectance spikes;

removing the reflectance spikes; and determining a fault in response to removing the reflectance spikes.

6. An apparatus for testing fiber-optic cable represented by a trace including reflectance spikes, the apparatus comprising:

means for generating a first-order derivative of the trace including the reflectance spikes;

means for removing the reflectance spikes; and means for determining a fault in response to removing the reflectance spikes.

7. A method of testing comprising the steps of:

acquiring an OTDR trace signal from a fiber-optic cable, the an OTDR trace signal characterizing operation of the fiber-optic cable;

determining a rate of change of the an OTDR trace signal;

removing the rate of change of the OTDR trace signal; and determining a fault in the fiber-optic cable in response to removing the rate of change of the an OTDR trace signal.

8. An apparatus for testing comprising:

means for acquiring an OTDR trace signal from a fiber-optic cable, the an OTDR trace signal characterizing operation of the fiber-optic cable;

means for determining a rate of change of the an OTDR trace signal;

means for removing the rate of change of the OTDR trace signal; and means for determining a fault in the fiber-optic cable in response to removing the rate of change of the an OTDR trace signal.

* * * * *